United States Patent
Wada

(10) Patent No.: US 10,574,907 B2
(45) Date of Patent: Feb. 25, 2020

(54) IMAGING SYSTEM, LENS DEVICE, AND METHOD OF OPERATING LENS DEVICE

(71) Applicant: FUJIFILM Corporation, Tokyo (JP)

(72) Inventor: Tetsu Wada, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/033,233

(22) Filed: Jul. 12, 2018

(65) Prior Publication Data

US 2018/0324363 A1 Nov. 8, 2018

Related U.S. Application Data

(63) Continuation of application No. PCT/JP2016/088190, filed on Dec. 21, 2016.

(30) Foreign Application Priority Data

Jan. 15, 2016 (JP) .................................. 2016-006586

(51) Int. Cl.
| | |
|---|---|
| *H04N 5/445* | (2011.01) |
| *H04N 5/225* | (2006.01) |
| *H04N 5/232* | (2006.01) |
| *H04N 5/222* | (2006.01) |
| *H04N 5/268* | (2006.01) |

(Continued)

(52) U.S. Cl.
CPC ........... *H04N 5/268* (2013.01); *H04N 5/2256* (2013.01); *H04N 5/232121* (2018.08); *H04N 5/232945* (2018.08); *H04N 5/247* (2013.01); *H04N 5/265* (2013.01); *H04N 5/44504* (2013.01)

(58) Field of Classification Search
None
See application file for complete search history.

(56) References Cited

U.S. PATENT DOCUMENTS

| | | | |
|---|---|---|---|
| 2010/0002071 A1 | 1/2010 | Ahiska | |
| 2013/0229396 A1* | 9/2013 | Huebner | .............. H04N 9/3147 345/207 |
| 2014/0015920 A1 | 1/2014 | Wu | |

FOREIGN PATENT DOCUMENTS

| | | |
|---|---|---|
| CN | 103546720 | 1/2014 |
| JP | 2000106647 | 4/2000 |

(Continued)

OTHER PUBLICATIONS

Office Action of China Counterpart Application, with English translation thereof, dated Nov. 15, 2018, p. 1-p. 9.

(Continued)

*Primary Examiner* — Mark T Monk
(74) *Attorney, Agent, or Firm* — JCIPRNET

(57) ABSTRACT

A first imaging unit images angle-of-view mark light of each of other television cameras. An image compositing unit generates a virtual angle-of-view mark image and a virtual angle-of-view frame image as a virtual angle-of-view image showing an imaging angle of view of each of the other television cameras in an imaging angle of view of the host television camera based on the angle-of-view mark light of each of the other television cameras. The image compositing unit generates a composite image by compositing the virtual angle-of-view mark image and the virtual angle-of-view frame image with a video image. The composite image is displayed on a lens monitor of a lens device that is detachable from a camera body.

15 Claims, 9 Drawing Sheets

(51) Int. Cl.
*H04N 5/247* (2006.01)
*H04N 5/265* (2006.01)

(56) References Cited

FOREIGN PATENT DOCUMENTS

| | | |
|---|---|---|
| JP | 2006174248 | 6/2006 |
| JP | 2011130234 | 6/2011 |

OTHER PUBLICATIONS

"International Search Report (Form PCT/ISA/210) of PCT/JP2016/088190," dated Mar. 21, 2017, with English translation thereof, pp. 1-3.
"Written Opinion of the International Searching Authority (Form PCT/ISA/237) of PCT/JP2016/088190," dated Mar. 21, 2017, with English translation thereof, pp. 1-7.

\* cited by examiner

IMAGING SYSTEM, LENS DEVICE, AND METHOD OF OPERATING LENS DEVICE

CROSS-REFERENCE TO RELATED APPLICATIONS

This application is a Continuation of PCT International Application No. PCT/JP2016/088190 filed on 21 Dec. 2016, which claims priority under 35 U.S.C. § 119(a) to Japanese Patent Application No. 2016-006586 filed on 15 Jan. 2016. The above application is hereby expressly incorporated by reference, in its entirety, into the present application.

BACKGROUND OF THE INVENTION

1. Field of the Invention

The present invention relates to an imaging system, a lens device, and a method of operating a lens device.

2. Description of the Related Art

Imaging in a studio at a broadcasting station is performed using an imaging system that includes a plurality of television cameras (imaging devices) imaging a subject at the same time. As disclosed in JP2000-106647A, the imaging system includes a video switching device (referred to as a switcher) that selects a plurality of video images generated by the television cameras. The selected video images are either output as an on-air image to a broadcasting device or output as a recording image to a recording device.

In JP2000-106647A, an evaluation value indicating the state of an automatic control system that automatically controls exposure and color reproduction is generated for each of the plurality of television cameras, and an optimal control value for imaging the subject is calculated based on the evaluation value. The automatic control system of each television camera is controlled using the optimal control value. Accordingly, it is possible to prevent variations in exposure and color representation for the subject among the plurality of television cameras.

SUMMARY OF THE INVENTION

A cameraman who operates a television camera decides a composition in the host television camera in accordance with the composition in another television camera in order not to make a viewer feel uncomfortable. Thus, a television camera is typically provided with a function of displaying a video image of another television camera in order for the cameraman to check the video image imaged by the other television camera. However, a function of checking the composition in the host television camera and the composition in the other television camera at the same time is not provided. Thus, a delay may be caused in deciding the composition in the host television camera in accordance with the composition in the other television camera, and a video image that is not switched in time using a video switching device and thus, makes the viewer feel uncomfortable may be output.

Some television camera may include a camera body and a lens device that is detachably attached to the camera body and replaceable. In a case where a function of checking the composition in the other television camera and the composition in the host television camera at the same time is provided in the camera body in such a television camera of which the lens device is replaceable, all existing camera bodies have to be replaced with new ones, and cost is increased.

An object of the invention is to provide an imaging system, a lens device, and a method of operating a lens device that enable a plurality of video images generated by a plurality of imaging devices to be smoothly switched at a reduced cost without making a viewer feel uncomfortable.

In order to achieve the object, an imaging system of the invention is an imaging system comprising a plurality of imaging devices that image a subject at the same time. Each imaging device includes a camera body and a lens device that is detachably attached to the camera body. The lens device has an imaging lens, an extracting unit, a first imaging unit, an image compositing unit, and a lens monitor. On the imaging lens, subject light including angle-of-view mark light that is emitted from other imaging devices and that shows an imaging angle of view of each of the other imaging devices is incident. The extracting unit extracts the angle-of-view mark light from the subject light. The first imaging unit images the angle-of-view mark light and outputs a first imaging signal for detecting the angle-of-view mark light. The image compositing unit generates a virtual angle-of-view image showing the imaging angle of view of each of the other imaging devices in an imaging angle of view of the host imaging device based on the first imaging signal, and generates a composite image by compositing the virtual angle-of-view image with a video image acquired by imaging the subject light after the angle-of-view mark light is removed by the extracting unit. The lens monitor displays the composite image.

It is preferable that the lens device includes a mark light detecting unit that detects the angle-of-view mark light based on the first imaging signal, and a calculating unit that calculates a position of a virtual angle-of-view mark showing the imaging angle of view of each of the other imaging devices in the imaging angle of view of the host imaging device based on the angle-of-view mark light. It is preferable that the image compositing unit generates the virtual angle-of-view image that corresponds to the position of the virtual angle-of-view mark.

It is preferable that the lens device has a mark light source that emits the angle-of-view mark light. In this case, it is preferable that the first imaging unit is an imaging unit for focus control that controls a focus of the imaging lens to be at a focused position. It is preferable that the mark light source is disposed in the first imaging unit. It is preferable that the angle-of-view mark light serves as light for the focus control and is emitted toward the subject through the imaging lens.

It is preferable that in addition to the virtual angle-of-view image, the image compositing unit composites, with the video image, a change displaying image that shows a change in the virtual angle-of-view image at the current point in time from the virtual angle-of-view image before a certain time period from the current point in time.

It is preferable that a light emitting pattern of the angle-of-view mark light is different for each of the plurality of imaging devices. It is preferable that the light emitting pattern is any one of a turn-on and turn-off interval, a light emission intensity, and a projection shape.

It is preferable that in a case where the virtual angle-of-view images of two or more of the other imaging devices are composited, the image compositing unit displays the virtual angle-of-view image in a different form for each of the other imaging devices.

It is preferable that the lens device includes an operating unit that selects an imaging device for which the virtual angle-of-view image is to be generated from the other imaging devices, and that the image compositing unit composites the virtual angle-of-view image of the imaging device selected by the operating unit.

It is preferable that the imaging system further comprises a video switching device that selects one video image from a plurality of the video images generated by the plurality of imaging devices and outputs the selected video image to an external device, and that the image compositing unit composites only the virtual angle-of-view image of the imaging device of which the video image is selected by the video switching device among the other imaging devices.

It is preferable that the imaging angle of view has a rectangular shape, and that the angle-of-view mark light has a projection shape along two orthogonal straight lines constituting a corner of the imaging angle of view.

It is preferable that the angle-of-view mark light is light in a wavelength range different from visible light.

It is preferable that the camera body has a camera monitor, and that the composite image is also displayed on the camera monitor.

A lens device of the invention is a lens device detachably attached to a camera body of an imaging device used in an imaging system that includes a plurality of imaging devices imaging a subject at the same time. The lens device comprises an imaging lens, an extracting unit, an imaging unit, an image compositing unit, and a lens monitor. On the imaging lens, subject light including angle-of-view mark light that is emitted from other imaging devices and that shows an imaging angle of view of each of the other imaging devices is incident. The extracting unit extracts the angle-of-view mark light from the subject light. The imaging unit images the angle-of-view mark light and outputs an imaging signal for detecting the angle-of-view mark light. The image compositing unit generates a virtual angle-of-view image showing the imaging angle of view of each of the other imaging devices in an imaging angle of view of the host imaging device based on the imaging signal, and generates a composite image by compositing the virtual angle-of-view image with a video image acquired by imaging the subject light after the angle-of-view mark light is removed by the extracting unit. The lens monitor displays the composite image.

A method of operating a lens device of the invention is a method of operating a lens device detachably attached to a camera body of an imaging device used in an imaging system that includes a plurality of imaging devices imaging a subject at the same time. The method comprises an extracting step, an imaging step, an image compositing step, and a displaying step. In the extracting step, an extracting unit extracts angle-of-view mark light that is emitted from other imaging devices and that shows an imaging angle of view of each of the other imaging devices, from subject light including the angle-of-view mark light. In the imaging step, an imaging unit images the angle-of-view mark light and outputs an imaging signal for detecting the angle-of-view mark light. In the image compositing step, an image compositing unit generates a virtual angle-of-view image showing the imaging angle of view of each of the other imaging devices in an imaging angle of view of the host imaging device based on the imaging signal, and generates a composite image by compositing the virtual angle-of-view image with a video image acquired by imaging the subject light after the angle-of-view mark light is removed by the extracting step. In the displaying step, the composite image is displayed on a lens monitor.

According to the invention, the composite image of the video image and the virtual angle-of-view image showing the imaging angle of view of each of the other imaging devices in the imaging angle of view of the host imaging device is displayed on the lens monitor of the lens device. Thus, it is possible to provide an imaging system, a lens device, and a method of operating a lens device that enable a plurality of video images generated by a plurality of imaging devices to be smoothly switched at a reduced cost without making a viewer feel uncomfortable.

DESCRIPTION OF THE PREFERRED EMBODIMENTS

First Embodiment

Figure 1:
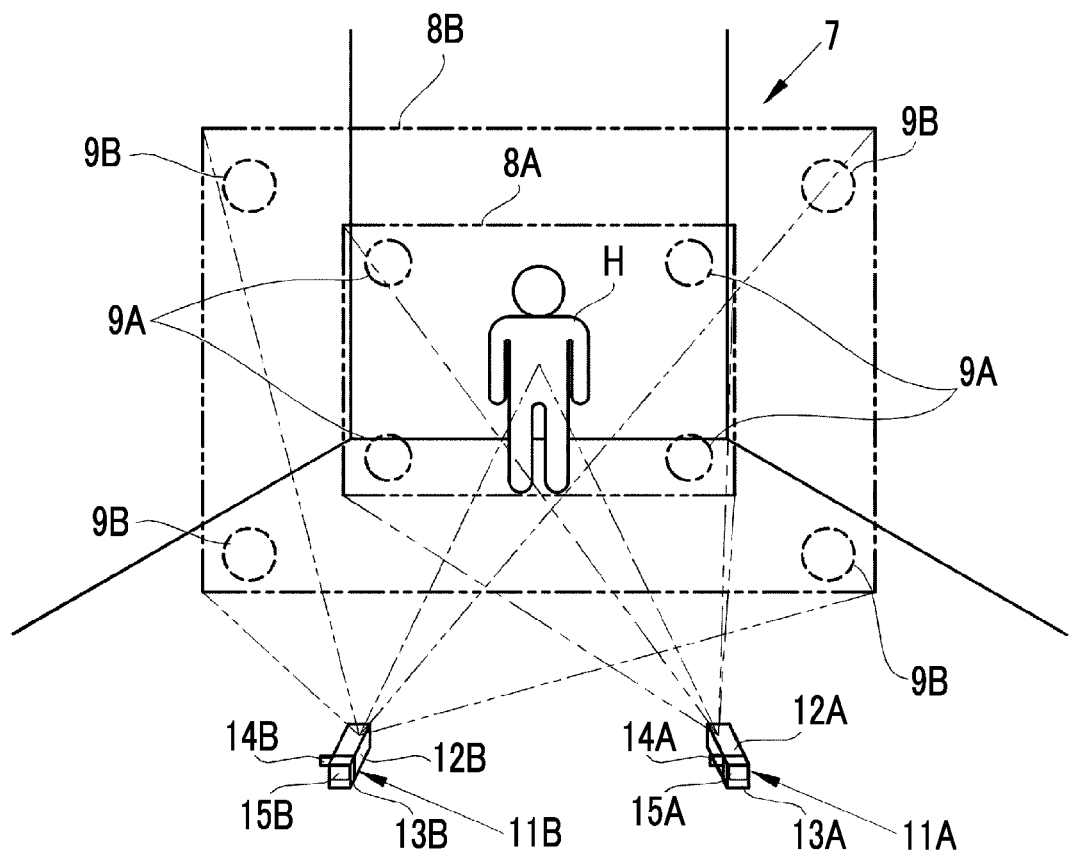
FIG. 1 is a diagram illustrating a state where a subject is being imaged by two television cameras at the same time in a studio.

FIG. 1 illustrates a state where a subject is being imaged by a first television camera 11A and a second television camera 11B as imaging devices at the same time in a studio 7. In the following description, reference numbers related to the first television camera 11A will be suffixed with "A", and reference numbers related to the second television camera 11B will be suffixed with "B" for distinction. Unless otherwise required for distinction, the letters "A" and "B" will not be added in description.

The first television camera 11A and the second television camera 11B have an imaging angle of view 8A and an imaging angle of view 8B, respectively. Each of the imaging angle of view 8A and the imaging angle of view 8B has a rectangular shape. Angle-of-view mark light 9A that shows the imaging angle of view 8A is emitted to the four corners of the imaging angle of view 8A. Similarly, angle-of-view mark light 9B that shows the imaging angle of view 8B is emitted to the four corners of the imaging angle of view 8B. The projection shape of each of the angle-of-view mark light 9A and the angle-of-view mark light 9B is a circular shape. In the case illustrated in FIG. 1, the centers of the imaging angle of views 8A and 8B match approximately, and a person H is present in the matching position. The imaging angle of view 8B is wider than the imaging angle of view 8A.

The angle-of-view mark light 9 is light in a wavelength range different from visible light, for example, infrared light. Visible light is light in a wavelength range of approximately 400 nm to 750 nm. Infrared light includes near-infrared light of 750 nm to 2.5 μm, mid-infrared light of 2.5 μm to 50 μm, and far-infrared light of 50 μm or longer. Thus, for example, infrared light in a wavelength range of 750 nm to 1,500 nm is used as the angle-of-view mark light 9. Visible light in a wavelength range of 650 nm to 750 nm that is close to the infrared region may also be used as the angle-of-view mark light 9.

The television camera 11 includes a lens device 12 and a camera body 13. The lens device 12 is detachably attached to the camera body 13 to be capable of being replaced with another lens device 12. A lens monitor 14 is installed in the lens device 12. A camera monitor 15 is installed in the camera body 13.

Figure 2:
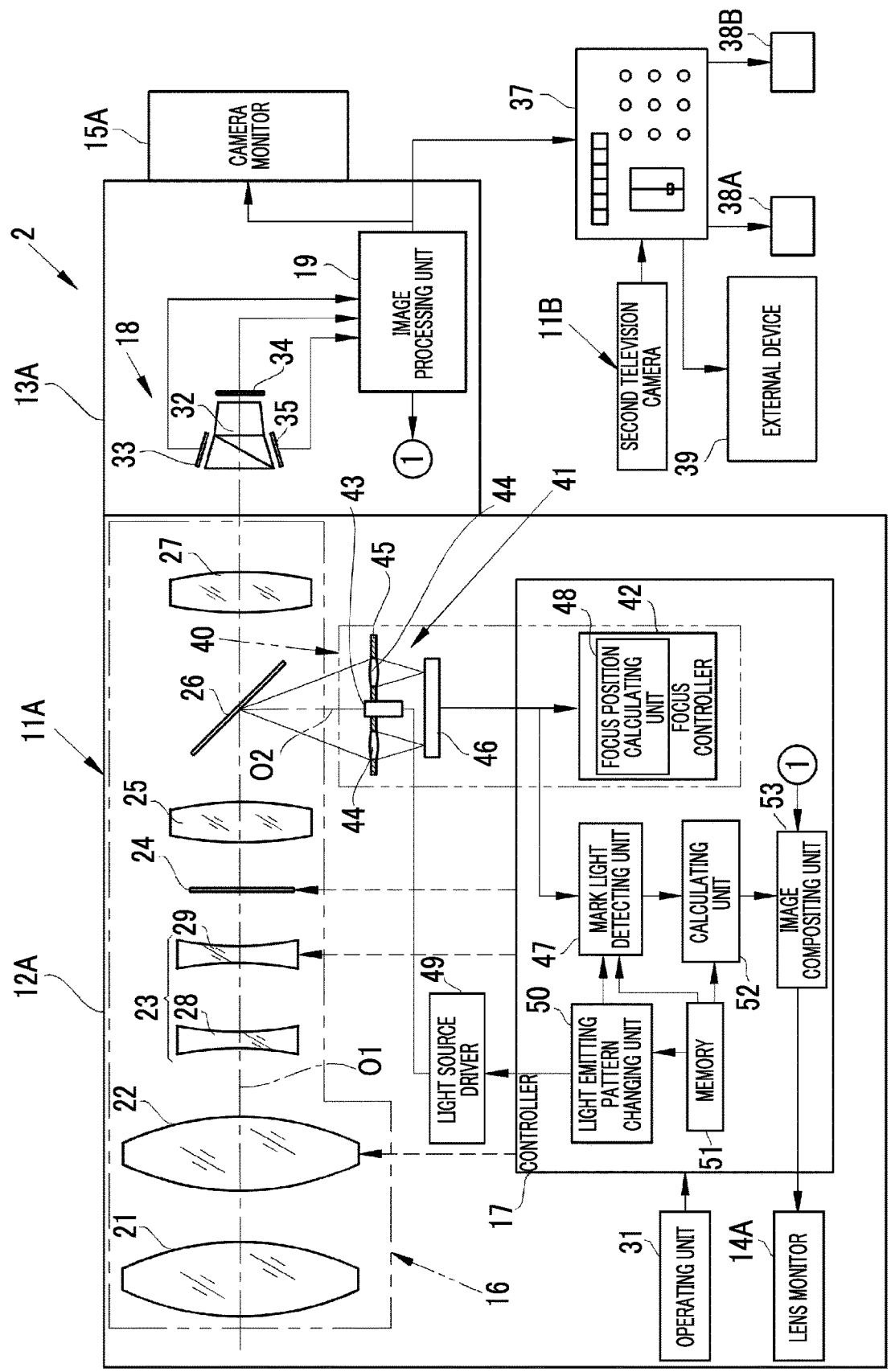
FIG. 2 is a diagram illustrating an internal configuration of an imaging system and a television camera.

In FIG. 2, the first television camera 11A and the second television camera 11B constitute an imaging system 2 along with a video switching device 37 and the like. The first television camera 11A and the second television camera 11B have completely the same internal configuration. Thus, in FIG. 2, only the internal configuration of the first television camera 11A is illustrated, and the internal configuration of the second television camera 11B is not illustrated.

The lens device 12 has an imaging lens 16 and a controller 17. Subject light is incident on the imaging lens 16. The subject light includes the person H, the floor and the wall of the studio 7, and also the angle-of-view mark light 9 in the imaging angle of view 8. The imaging lens 16 has, for example, a fixed-focus lens 21, a moving focus lens 22, a zoom lens 23, a variable stop (iris) 24, a front relay lens 25, a dichroic mirror 26, and a rear relay lens 27 in this order from the subject side. The fixed-focus lens 21, the moving focus lens 22, the zoom lens 23, the variable stop 24, the front relay lens 25, the dichroic mirror 26, and the rear relay lens 27 have a matching optical axis O1. The moving focus lens 22 can move along the optical axis O1. The zoom lens 23 has lenses 28 and 29 of a magnification changing system and a correction system. In FIG. 2, the configuration of each lens is simplified, and a lens group composed of a plurality of lenses is illustrated as one lens.

The controller 17 controls the position of the moving focus lens 22, the position of the zoom lens 23, and the F number of the variable stop 24. The lens monitor 14 and an operating unit 31 are connected to the controller 17. The lens monitor 14 includes a liquid crystal panel. The lens monitor 14 displays a graphic screen and the like showing the state of various settings of the lens device 12. In addition, the lens monitor 14 displays a composite image 55 (refer to FIG. 4) as will be described later. The operating unit 31 has an operating key and an operating knob (not illustrated). Various settings of the lens device 12 can be set by operating the operating key and the operating knob while viewing the lens monitor 14.

The camera body 13 has a second imaging unit 18 and an image processing unit 19. The second imaging unit 18 images the subject light incident from the lens device 12 and outputs a second imaging signal for video. The second imaging unit 18 has a color separating optical system 32 and three video imaging elements 33, 34, and 35. The color separating optical system 32 separates the subject light into red light, green light, and blue light of three colors. Each of the video imaging elements 33 to 35 includes a solid-state imaging device such as charged-coupled devices (CCD) or a complementary metal-oxide-semiconductor (CMOS). The video imaging elements 33 to 35 convert the light of three colors separated by the color separating optical system 32 into the second imaging signal.

The image processing unit 19 performs a predetermined process on the second imaging signal output from the video imaging elements 33 to 35 to generate a video image. The image processing unit 19 transmits the video image to the camera monitor 15. The camera monitor 15 displays the video image as a through-image (live view). In addition, the image processing unit 19 transmits the video image to an image compositing unit 53 of the lens device 12.

The image processing unit 19 also transmits the video image to the video switching device 37. Two switcher monitors 38A and 38B are connected to the video switching device 37. The switcher monitor 38A displays the video image from the first television camera 11A. The switcher monitor 38B displays the video image from the second television camera 11B. A staff member who operates the video switching device 37 observes each video image displayed on the switcher monitors 38A and 38B and operates the video switching device 37 to select the video image that has a desired composition. Accordingly, each video image from the first television camera 11A and the second television camera 11B is switched at an appropriate timing and output as an on-air image or a recording image to an external device 39 that is a broadcasting device or a recording device.

The video switching device 37 transmits information on the television camera 11 of the selected video image to each of the television cameras 11A and 11B. The television camera 11 of the selected video image informs the person H that the video image is selected by, for example, lighting an on-air lamp included in the camera body 13.

The dichroic mirror 26 is disposed to be inclined at an angle of approximately 45 degrees with respect to the optical axis O1 between the front relay lens 25 and the rear relay lens 27 that constitute a relay optical system. The dichroic mirror 26 reflects the angle-of-view mark light 9 of the subject light and transmits light of the subject light other than the angle-of-view mark light 9. In the present embodiment, since the angle-of-view mark light 9 is infrared light in a wavelength range of 750 nm to 1,500 nm, the dichroic mirror 26 reflects infrared light in a wavelength range of 750 nm to 1,500 nm and transmits other light, for example, visible light in a wavelength range of approximately 400 nm to 750 nm. That is, the dichroic mirror 26 functions as an extracting unit that extracts the angle-of-view mark light 9 from the subject light. The subject light after the angle-of-view mark light 9 is removed by the dichroic mirror 26 is guided to the second imaging unit 18 in the camera body 13 along the optical axis O1. Meanwhile, the angle-of-view mark light 9 is reflected by the dichroic mirror 26 at an angle of 90 degrees and is guided to a pupil-splitting phase-difference automatic focusing device 40 along an optical axis O2 that is orthogonal to the optical axis O1.

The automatic focusing device 40 has a first imaging unit 41 and a focus controller 42. The first imaging unit 41 has a mark light source 43, a pupil-splitting lens 44, a light screen 45, and a focus sensor 46. The pupil-splitting lens 44 is disposed in positions in the light screen 45 that correspond to a plurality of pupil regions in an exit pupil of the imaging lens 16. The focus sensor 46 includes an imaging element that reacts to the angle-of-view mark light 9 and converts the angle-of-view mark light 9 into an electric signal. The angle-of-view mark light 9 that passes through the pupil-splitting lens 44 is imaged by the first imaging unit 41 using the focus sensor 46, and the first imaging unit 41 outputs a first imaging signal. The first imaging unit 41 outputs the first imaging signal to the focus controller 42 and a mark light detecting unit 47.

The focus controller 42 has a focus position calculating unit 48. The focus position calculating unit 48 detects a deviation (defocus amount) of the focus of the imaging lens 16 based on the first imaging signal from the focus sensor 46. The focus controller 42 moves the moving focus lens 22 along the optical axis O1 such that the defocus amount becomes equal to "0". Accordingly, automatic focus control is performed to set a focused position. The first imaging unit 41 is an imaging unit for focus control that controls the focus of the imaging lens 16 to be at the focused position. The first imaging signal is used for detecting the angle-of-view mark light and is also used for focus control. The angle-of-view mark light 9 serves as light for focus control. The calculation of the defocus amount using phase difference based on pupil splitting, and the focus control based on the defocus amount are well known and thus, will not be described in detail.

Figure 3:
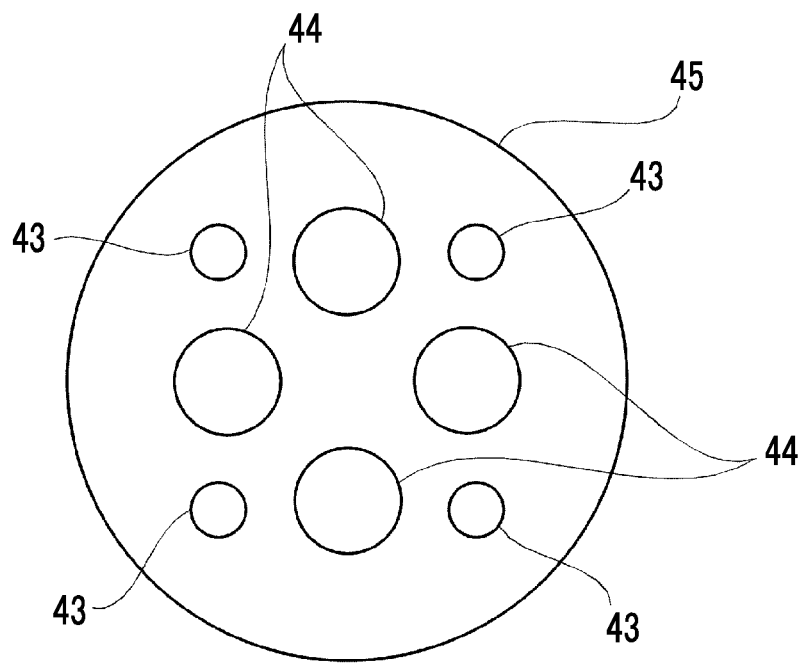
FIG. 3 is a front view illustrating a pupil-splitting lens and a mark light source.

As illustrated in FIG. 3, the light screen 45 has four mark light sources 43 and four pupil-splitting lenses 44. The pupil-splitting lenses 44 are disposed at equal intervals in the upper, lower, left, and right parts of the light screen 45. Each mark light source 43 is disposed between the adjacent pupil-splitting lenses 44. Each mark light source 43 includes a light emitting diode (LED) or a laser.

In FIG. 2, a light source driver 49 is connected to each mark light source 43. Each mark light source 43 emits the angle-of-view mark light 9 in a predetermined light emitting pattern under control of the light source driver 49. The angle-of-view mark light 9 emitted from each mark light source 43 is guided to the dichroic mirror 26 along the optical axis O2 and is reflected by the dichroic mirror 26 at an angle of 90 degrees. Then, the angle-of-view mark light 9 passes through the imaging lens 16 along the optical axis O1 and is emitted toward the subject in the studio 7 as illustrated in FIG. 1. In a case where the angle-of-view mark light 9 hits the subject, reflective light is guided to the focus sensor 46 through the imaging lens 16, the dichroic mirror 26, and each pupil-splitting lens 44.

A light emitting pattern changing unit 50 of the controller 17 is connected to the light source driver 49. The light emitting pattern changing unit 50 is provided with, for example, 10 types of light emitting patterns from a memory 51. Each light emitting pattern has a different turn-on and turn-off interval (light emission ON-OFF time) and/or a light emission intensity. The light emitting pattern changing unit 50 sets one light emitting pattern that is selected from the 10 types of light emitting patterns by the cameraman or the like through the operating unit 31. The light source driver 49 controls each mark light source 43 such that the angle-of-view mark light 9 is emitted in the light emitting pattern set by the light emitting pattern changing unit 50.

Different light emitting patterns are set for the angle-of-view mark light 9A and the angle-of-view mark light 9B. By identifying the light emitting patterns of the angle-of-view mark light 9A and the angle-of-view mark light 9B, it is possible to specify whether the emission source of the angle-of-view mark light 9 is the mark light source 43 of the television camera 11A or the mark light source 43 of the television camera 11B. Accordingly, by specifying the emission source of the angle-of-view mark light 9, the imaging angle of views 8A and 8B of the television cameras 11A and 11B can be estimated.

In the present embodiment, each mark light source 43 is disposed between the pupil-splitting lenses 44 as illustrated in FIG. 3. Since each mark light source 43 emitting the angle-of-view mark light 9 is disposed separately from each pupil-splitting lens 44 that receives the angle-of-view mark light 9, the angle-of-view mark light 9 can be emitted to the four corners of the imaging angle of view 8 as illustrated in FIG. 1 without hindering each pupil-splitting lens 44 from receiving the angle-of-view mark light 9. The angle-of-view mark light 9 from each mark light source 43 is emitted toward the subject through the imaging lens 16 that includes the zoom lens 23. Accordingly, regardless of the zoom magnification of the imaging lens 16, the angle-of-view mark light 9 can be emitted to certain positions close to the four corners of the imaging angle of view 8 at all times. In addition, regardless of not only the zoom magnification but also the distance to the subject, the angle-of-view mark light 9 can be emitted to certain positions close to the four corners of the imaging angle of view 8 at all times.

In the state illustrated in FIG. 1, the subject light that includes only the angle-of-view mark light 9A of the host first television camera 11A is incident on the imaging lens 16A of the first television camera 11A. Meanwhile, the subject light that includes the angle-of-view mark light 9B of the host second television camera 11B and also the angle-of-view mark light 9A from the first television camera 11A is incident on the imaging lens 16B of the second television camera 11B. Each of the angle-of-view mark light 9A and the angle-of-view mark light 9B is infrared light in a wavelength range different from visible light, and is reflected by the dichroic mirror 26 and not guided to the second imaging unit 18. Thus, the angle-of-view mark light 9A and the angle-of-view mark light 9B do not affect the second imaging signal output from the second imaging unit 18.

The mark light detecting unit 47 detects the angle-of-view mark light 9 based on the first imaging signal from the first imaging unit 41. Specifically, an area that emits light in a certain light emitting pattern in the image based on the first imaging signal is detected as the angle-of-view mark light 9. Based on the light emitting pattern, the mark light detecting unit 47 specifies whether the detected angle-of-view mark light 9 is emitted from the mark light source 43 of the host television camera 11 or emitted from the mark light source 43 of another television camera 11. A correspondence between each light emitting pattern of the angle-of-view mark light 9 and each television camera 11 for which each light emitting pattern is set is stored in the memory 51. The mark light detecting unit 47 specifies the emission source of the angle-of-view mark light 9 by referencing this correspondence. The mark light detecting unit 47 outputs the result of detection of the angle-of-view mark light 9 and the result of specifying the emission source of the angle-of-view mark light 9 to a calculating unit 52.

The calculating unit 52 calculates the position of a virtual angle-of-view mark showing the imaging angle of view 8 of the other television camera 11 in the imaging angle of view 8 of the host television camera 11 based on the result of detection of the angle-of-view mark light 9 of the mark light detecting unit 47. A positional relationship between the image based on the first imaging signal and the imaging angle of view 8 of the host television camera 11 is stored in advance in the memory 51. The calculating unit 52 performs the calculation by referencing this correspondence. The position of the virtual angle-of-view mark is the projection position of the angle-of-view mark light 9 of the other television camera 11 that is present in the imaging angle of view 8 of the host television camera 11. For example, in the state illustrated in FIG. 1, the calculating unit 52B of the second television camera 11B calculates the position of the virtual angle-of-view mark (the projection position of the angle-of-view mark light 9A) showing the imaging angle of view 8A of the first television camera 11A in the imaging angle of view 8B of the host second television camera 11B based on the result of detection of the angle-of-view mark light 9A. The calculating unit 52 transmits the calculated position of the virtual angle-of-view mark to the image compositing unit 53.

The calculating unit 52 acquires a virtual angle-of-view frame showing the frame of the imaging angle of view 8 of the other television camera 11 based on the position of the virtual angle-of-view mark. Specifically, the virtual angle-of-view frame is specified from a rectangular frame that includes line segments connecting the virtual angle-of-view mark. The calculating unit 52 outputs the result of specifying the virtual angle-of-view frame to the image compositing unit 53.

The calculating unit 52 calculates only the position of the virtual angle-of-view mark based on the angle-of-view mark light 9 from the other television camera 11, and does not calculate the position of the virtual angle-of-view mark for the angle-of-view mark light 9 of the host television camera 11. For example, in the state illustrated in FIG. 1, while the angle-of-view mark light 9B of the host second television camera 11B is present in the imaging angle of view 8B of the host second television camera 11B, the calculating unit 52B of the second television camera 11B does not calculate the position of the virtual angle-of-view mark for the angle-of-view mark light 9B. The same applies to the virtual angle-of-view frame, and the calculating unit 52 does not specify the virtual angle-of-view frame of the host television camera 11. Whether or not the angle-of-view mark light 9 is from the host television camera 11 is determined from the result of specifying the emission source of the angle-of-view mark light 9 from the mark light detecting unit 47.

The image compositing unit 53 generates a virtual angle-of-view image that corresponds to the position of the virtual angle-of-view mark and the virtual angle-of-view frame from the calculating unit 52. The image compositing unit 53 composites the virtual angle-of-view image with the video image based on the second imaging signal from the second imaging unit 18 to generate the composite image. The image compositing unit 53 outputs the generated composite image to the lens monitor 14. The lens monitor 14 displays the composite image as a through-image.

Figure 4:
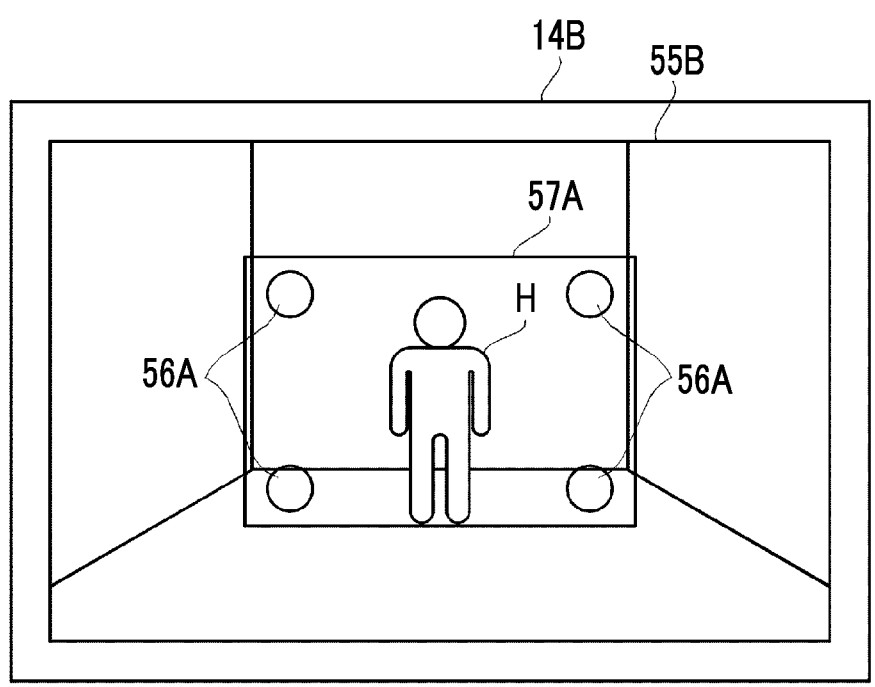
FIG. 4 is a diagram illustrating a composite image.

FIG. 4 illustrates a composite image 55B displayed on the lens monitor 14B of the second television camera 11B in the state illustrated in FIG. 1. The composite image 55B is acquired by compositing the video image that is imaged by the second television camera 11B and has the person H and the floor and the wall of the studio 7, with a virtual angle-of-view mark image 56A and a virtual angle-of-view frame image 57A as the virtual angle-of-view image. The virtual angle-of-view mark image 56A shows the angle-of-view mark light 9A from the first television camera 11A. The virtual angle-of-view frame image 57A shows the frame of the imaging angle of view 8A of the first television camera 11A. The virtual angle-of-view mark image 56A has the same circular shape as the projection shape of the angle-of-view mark light 9.

A cameraman of the second television camera 11B can easily find the current composition of imaging performed by the second television camera 11B and also the current composition of imaging performed by the first television camera 11A by viewing the composite image 55B through the lens monitor 14B. Accordingly, the cameraman of the second television camera 11B can immediately decide the composition in the second television camera 11B in accordance with the composition in the first television camera 11A, and can image a video image that does not make a viewer feel uncomfortable with respect to the video image of the first television camera 11A using the second television camera 11B.

While illustration is not provided, the angle-of-view mark light 9B from the second television camera 11B is not emitted to the inside of the imaging angle of view 8A of the first television camera 11A in the state illustrated in FIG. 1. Thus, the virtual angle-of-view mark image 56B showing the angle-of-view mark light 9B, and the virtual angle-of-view frame image 57B showing the frame of the imaging angle of view 8B are not composited in the composite image 55A displayed on the lens monitor 14A of the first television camera 11A. That is, the composite image 55A is the video image based on the second imaging signal from the second imaging unit 18A of the first television camera 11A.

Figure 5:
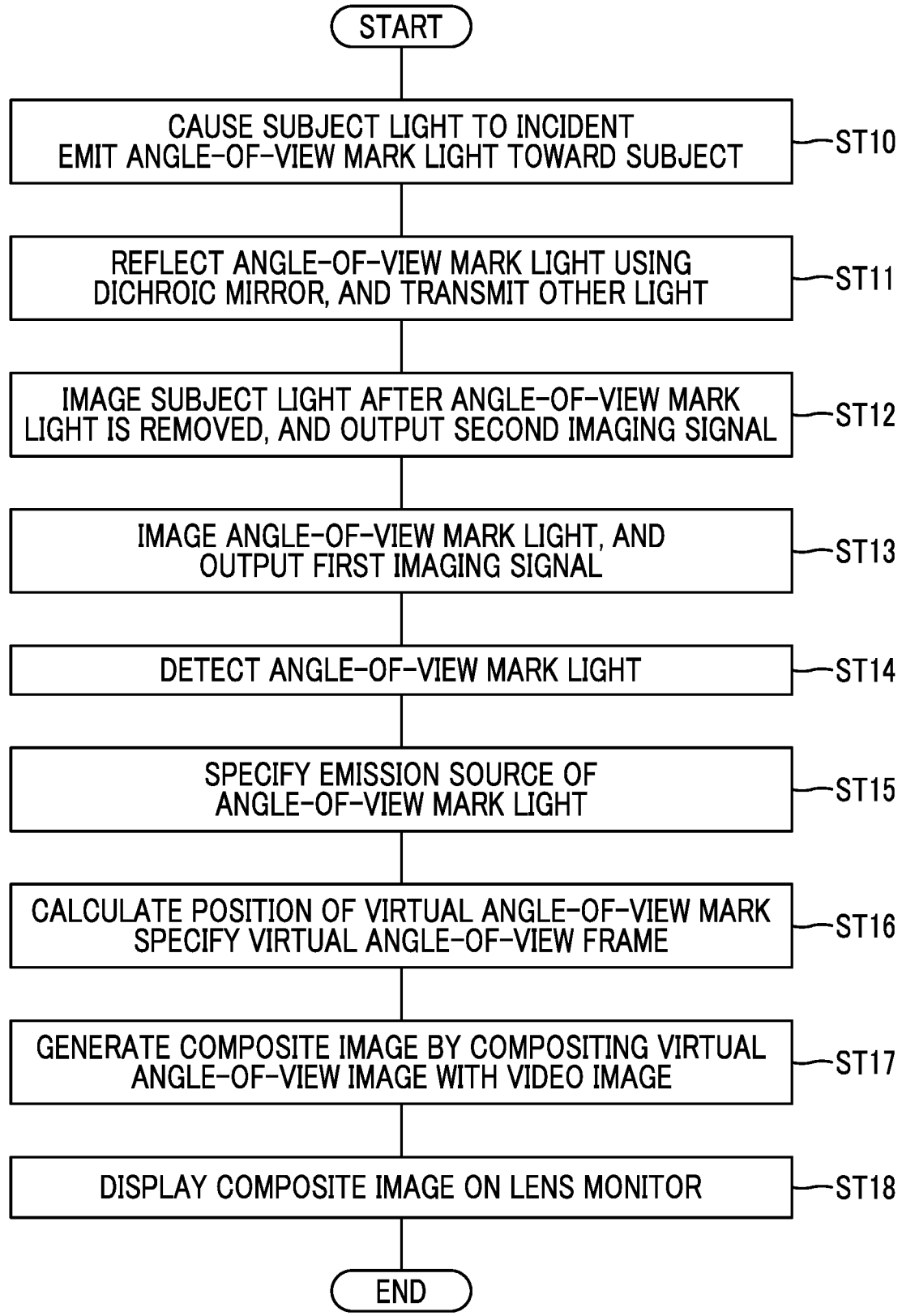
FIG. 5 is a flowchart illustrating a procedure of subject imaging using the television camera.

Hereinafter, the effect of the imaging system 2 and a method of imaging in the studio 7 using the imaging system 2 in the present embodiment will be described with reference to a flowchart in FIG. 5. First, the television camera 11 is started up, and imaging of the subject using the television camera 11 is started. The subject light is incident on the imaging lens 16. The angle-of-view mark light 9 is emitted toward the subject from each mark light source 43 (step ST10).

In the subject light incident on the imaging lens 16, light except the angle-of-view mark light 9 is transmitted through the dichroic mirror 26 and guided to the second imaging unit 18. The angle-of-view mark light 9 is reflected by the dichroic mirror 26 and guided to the first imaging unit 41 (step ST11; extracting step). In the second imaging unit 18, the subject light after the angle-of-view mark light 9 is removed is imaged, and the second imaging signal is output (step ST12). The second imaging signal is converted into a video image by the image processing unit 19. Meanwhile, in the first imaging unit 41, the angle-of-view mark light 9 is imaged, and the first imaging signal is output (step ST13; imaging step). The first imaging signal is used for focus control performed by the focus controller 42, and is also output to the mark light detecting unit 47.

In the mark light detecting unit 47, the angle-of-view mark light 9 is detected based on the first imaging signal (step ST14). In addition, the emission source of the angle-of-view mark light 9 is specified based on the light emitting pattern of the angle-of-view mark light 9 (step ST15). The result of detection of the angle-of-view mark light 9 and the result of specifying the emission source of the angle-of-view mark light 9 are output to the calculating unit 52.

In the calculating unit 52, the position of the virtual angle-of-view mark is calculated, and the virtual angle-of-view frame is specified based on the result of detection of the angle-of-view mark light 9 (step ST16). At this point, only the position of the virtual angle-of-view mark and the virtual angle-of-view frame based on the angle-of-view mark light 9 from the other television camera 11 are calculated and specified. The result of calculation of the position of the virtual angle-of-view mark, and the result of specifying the virtual angle-of-view frame are transmitted to the image compositing unit 53.

In the image compositing unit 53, the virtual angle-of-view mark image 56 and the virtual angle-of-view frame image 57 are generated as the virtual angle-of-view image. The virtual angle-of-view mark image 56 and the virtual angle-of-view frame image 57 are composited with the video image that is subjected to image processing by the image processing unit 19 (step ST17; image compositing step). In the image compositing, the virtual angle-of-view mark image 56 is composited at the projection position of the angle-of-view mark light 9 of the other television camera 11 based on the result of calculation of the position of the virtual angle-of-view mark from the calculating unit 52. In addition, based on the result of specifying the virtual angle-of-view frame, the virtual angle-of-view frame image 57 is composited on the frame of the imaging angle of view 8 of the other television camera 11 that corresponds to the projection position of the angle-of-view mark light 9. The composite image 55 is displayed on the lens monitor 14 as illustrated in FIG. 4 (step ST18; displaying step). In a case where the angle-of-view mark light 9 of the other television camera 11 is not detected in steps ST14 and ST15 as in the first television camera 11A of the present embodiment, steps ST16 and ST17 are not performed, and the video image is displayed on the lens monitor 14.

Since the virtual angle-of-view image (the virtual angle-of-view mark image 56 and the virtual angle-of-view frame image 57) showing the imaging angle of view 8 of the other television camera 11 in the imaging angle of view 8 of the host television camera 11 is composited with the video image, and the generated composite image 55 is displayed on the lens monitor 14, the cameraman recognizes the composition of imaging in the other television camera 11 at the same time as the composition in the host television camera 11 by viewing the composite image 55 displayed on the lens monitor 14. Thus, there is no delay in deciding the composition for the cameraman, and a video image that is not switched in time using the video switching device 37 and thus, makes the viewer feel uncomfortable is not output. Accordingly, the video image can be smoothly switched without making the viewer feel uncomfortable.

All functional units of the lens monitor 14, the mark light detecting unit 47, the calculating unit 52, and the image compositing unit 53 that generate and display the composite image 55 are disposed in the lens device 12. Thus, the composition in the other television camera 11 can be checked by replacing only the lens device 12 of the invention without replacing the existing camera body 13. Accordingly, the function of checking the composition in the other television camera 11 and the composition in the host television camera 11 at the same time can be introduced in the existing television camera 11 at a low cost.

The video image needs to be transmitted to the image compositing unit 53 of the lens device 12 from the image processing unit 19 in the camera body 13. Since a terminal for outputting the video image to the outside is generally disposed in the camera body 13, the video image may be transmitted to the image compositing unit 53 using the terminal. Thus, the camera body 13 does not need a special modification.

Since a light source for focus control disposed in the first imaging unit 41 that is an imaging unit for focus control is used as the mark light source 43, and light for focus control is used as the angle-of-view mark light 9, an existing light source for focus control that is generally included in the television camera 11 can be effectively used. Since a dedicated light source for the angle-of-view mark light 9 does not need to be disposed separately, product cost can be reduced, and the television camera 11 can be made compact.

Since the angle-of-view mark light 9 is light in a wavelength range different from visible light, the angle-of-view mark light 9 does not flash and hinder imaging.

While the virtual angle-of-view image that includes the virtual angle-of-view mark image 56 and the virtual angle-of-view frame image 57 is displayed on the lens monitor 14 in the first embodiment, the virtual angle-of-view image may include either the virtual angle-of-view mark image 56 or the virtual angle-of-view frame image 57. In addition, the shape of the virtual angle-of-view mark image 56 may be the same shape (in the present embodiment, a circular shape) as the projection shape of the angle-of-view mark light 9, or may be a different shape (in the present embodiment, a triangular shape, a quadrangular shape, other polygonal shapes, an L shape, and the like) from the projection shape of the angle-of-view mark light 9.

While the imaging system 2 that includes the two television cameras 11A and 11B is illustrated in the embodiment, the imaging system may include three or more television cameras 11. In this case, the number of television cameras 11 other than the host television camera 11 is greater than or equal to two. The image compositing unit 53 may composite the virtual angle-of-view images of all of the other two or more television cameras 11. In this case, it is preferable to display the virtual angle-of-view image in a different form for each of the other television cameras 11 as illustrated in FIG. 6.

Figure 6:
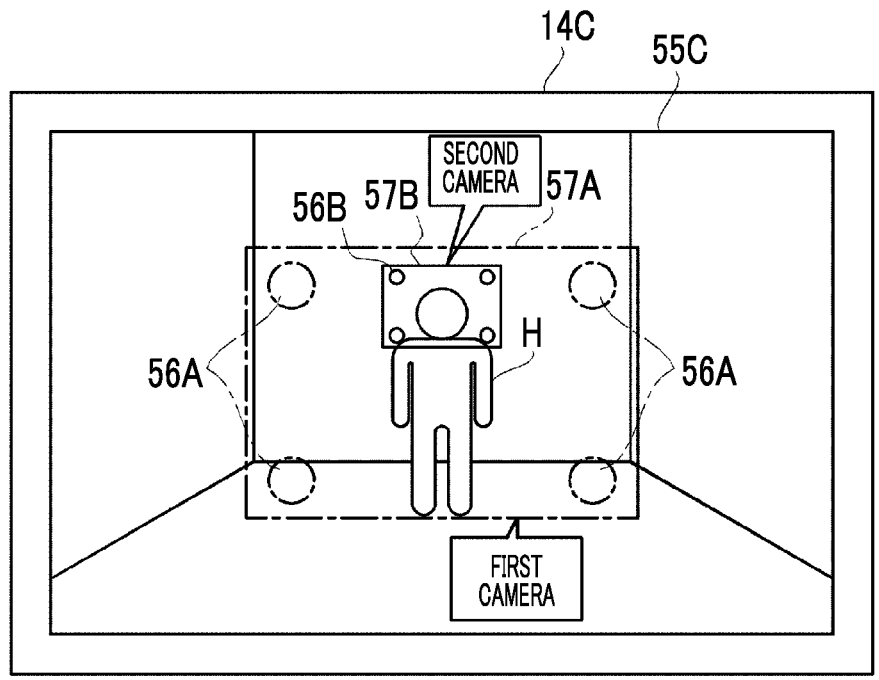
FIG. 6 is a diagram illustrating display of a virtual angle-of-view image in a different form for each television camera.

FIG. 6 is an example of a composite image 55C displayed on a lens monitor 14C of a third television camera 11C (not illustrated) in the imaging system that includes three television cameras 11A, 11B, and 11C. The composite image 55C displays the virtual angle-of-view mark image 56A showing the angle-of-view mark light 9A from the first television camera 11A, the virtual angle-of-view frame image 57A showing the frame of the imaging angle of view 8A of the first television camera 11A, the virtual angle-of-view mark image 56B showing the angle-of-view mark light 9B from the second television camera 11B, and the virtual angle-of-view frame image 57B showing the frame of the imaging angle of view 8B of the second television camera 11B. The virtual angle-of-view mark image 56A and the virtual angle-of-view frame image 57A are set to be displayed in a different form from the virtual angle-of-view mark image 56B and the virtual angle-of-view frame image 57B using the name of the television camera 11 as illustrated in FIG. 6, or by setting different colors, different line types, and different thicknesses of line, flashing either the virtual angle-of-view mark image 56A and the virtual angle-of-view frame image 57A, or the virtual angle-of-view mark image 56B and the virtual angle-of-view frame image 57B, or the like. By displaying the virtual angle-of-view image in a different form for each of the other television cameras 11 in a case where the virtual angle-of-view images of the other two or more television cameras 11 are composited, the cameraman can distinguish the virtual angle-of-view images from each other at a glance.

Alternatively, the virtual angle-of-view image may be switched as desired and displayed by disposing, in the operating unit 31, a switching switch that selects the television camera 11 of which the virtual angle-of-view image is to be composited from the other television cameras 11, and causing the image compositing unit 53 to composite the virtual angle-of-view image of the television camera 11 selected by the switching switch. The number of television cameras 11 that can be selected by the switching switch may be one or more. Accordingly, the cameraman can recognize the composition in the other television camera 11 that the cameraman desires to view.

Figure 7:
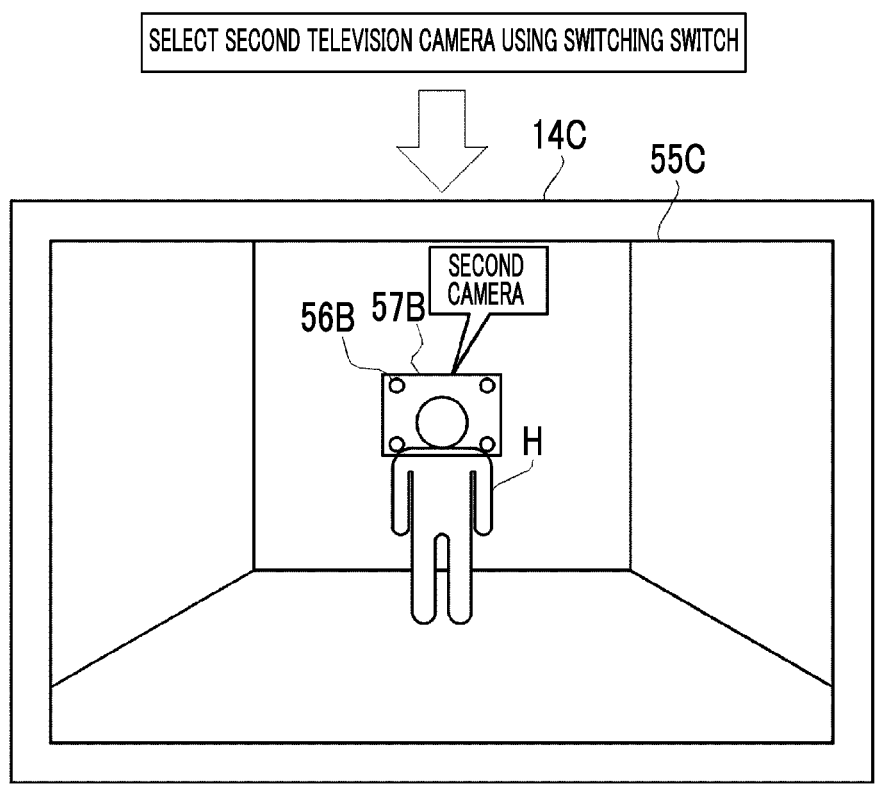
FIG. 7 is a diagram illustrating compositing of only the virtual angle-of-view image of the television camera selected by a switching switch.

FIG. 7 is an example of the composite image 55C displayed on the lens monitor 14C of the third television camera 11C in the imaging system that includes the three television cameras 11A, 11B, and 11C as in FIG. 6. The second television camera 11B is assumed to be selected by the switching switch of the operating unit 31. In this case, the image compositing unit 53 does not composite the virtual angle-of-view mark image 56A and the virtual angle-of-view frame image 57A of the first television camera 11A that is not selected by the switching switch. The image compositing unit 53 composites only the virtual angle-of-view mark image 56B and the virtual angle-of-view frame image 57B of the second television camera 11B selected by the switching switch. Accordingly, the composite image 55C displays only the virtual angle-of-view mark image 56B and the virtual angle-of-view frame image 57B unlike FIG. 6.

Figure 8:
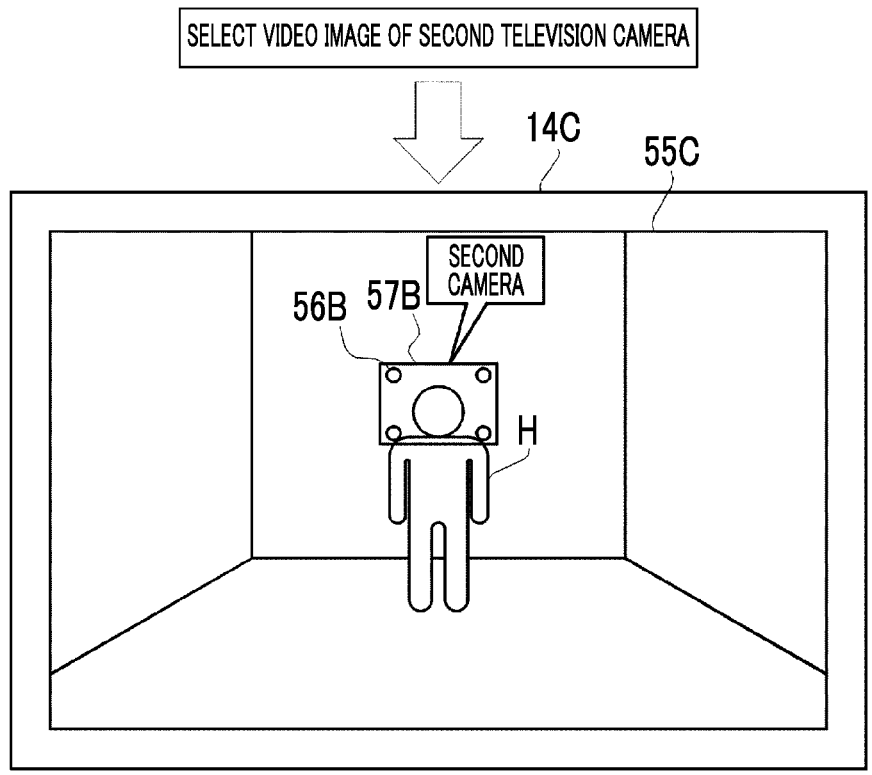
FIG. 8 is a diagram illustrating compositing of only the virtual angle-of-view image of the television camera for which a video image is selected by a video switching device.

Alternatively, only the virtual angle-of-view image of the television camera 11 of which the video image is selected by the video switching device 37 may be composited as illustrated in FIG. 8.

FIG. 8 is an example of the composite image 55C displayed on the lens monitor 14C of the third television camera 11C in the imaging system that includes the three television cameras 11A, 11B, and 11C as in FIG. 6 and FIG. 7. The video image of the second television camera 11B is assumed to be selected by the video switching device 37. In this case, the image compositing unit 53 does not composite the virtual angle-of-view mark image 56A and the virtual angle-of-view frame image 57A of the first television camera 11A that is not selected by the video switching device 37. The image compositing unit 53 composites only the virtual angle-of-view mark image 56B and the virtual angle-of-view frame image 57B of the second television camera 11B selected by the video switching device 37. Accordingly, the composite image 55C displays only the virtual angle-of-view mark image 56B and the virtual angle-of-view frame image 57B unlike FIG. 6.

The television camera 11 in which the cameraman desires to check the composition first is the television camera 11 of which the video image is currently selected by the video switching device 37. Thus, at least the object can be accomplished by compositing only the virtual angle-of-view image of the television camera 11 of which the video image is selected by the video switching device 37. In addition, the composite image 55 is clearly displayed and easily viewed further than in a case where all of the virtual angle-of-view images of the other television cameras 11 are displayed as in FIG. 6.

MODIFICATION EXAMPLE 1

Figure 9:
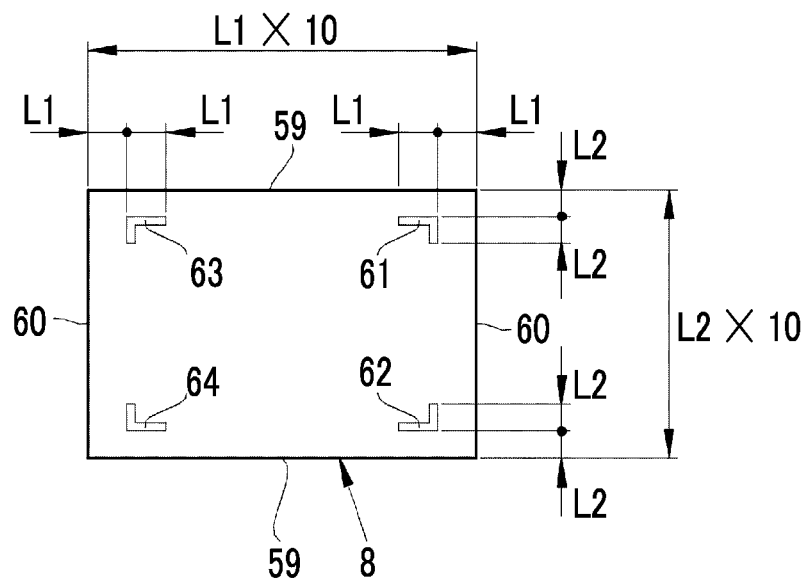
FIG. 9 is a diagram illustrating angle-of-view mark light having an L-shaped projection shape.

In a case where the angle-of-view mark light 9 has a shape that does not have directivity such as a simple circular shape as in the first embodiment, the imaging angle of view 8 cannot be correctly detected from the angle-of-view mark light 9 in a case where the angle-of-view mark light 9 is not detected at two of the four positions on the same edge sides of the imaging angle of view 8, such as a case where the angle-of-view mark light 9 is emitted in an outdoor space where a wall or the like reflecting the angle-of-view mark light 9 is not present, and a case where the mark light source 43 fails to function. Thus, in Modification Example 1, angle-of-view mark light 61, angle-of-view mark light 62, angle-of-view mark light 63, and angle-of-view mark light 64, each of which has an L-shaped projection shape along two orthogonal straight lines constituting a corner of the imaging angle of view 8, are emitted to positions close to the four corners of the imaging angle of view 8 as illustrated in FIG. 9. Instead of the L shape, each of the angle-of-view mark light 61 to the angle-of-view mark light 64 may have a shape in which the direction of the imaging angle of view 8 is indicated by one angle-of-view mark light, such as a right triangle (refer to FIG. 10A) that has two edges along the two orthogonal straight lines constituting the corner of the imaging angle of view 8.

In each of the L-shaped angle-of-view mark light 61 to the angle-of-view mark light 64, lengths L1 and L2 of the edges are formed to be lengths of a certain ratio with respect to a horizontal edge 59 and a vertical edge 60 of the imaging angle of view 8, for example, 1/10. The projection position of each of the angle-of-view mark light 61 to the angle-of-view mark light 64 is a position separated by L1 and L2 inwards from each of the four corners of the imaging angle of view 8. In this configuration, since the lengths of the horizontal edge 59 and the vertical edge 60 of the imaging angle of view 8 are found from the length L1 along the horizontal edge 59 and the length L2 along the vertical edge 60, and the length L1 along the horizontal edge 59 is different from the length L2 along the vertical edge 60, the correspondence between each of the L-shaped angle-of-view mark light 61 to the angle-of-view mark light 64 and each of the four corners of the imaging angle of view 8 is found from the positional relationship between the part having the length L1 and the part having the length L2. Accordingly, by detecting just one of the L-shaped angle-of-view mark light 61 to the angle-of-view mark light 64, the imaging angle of view 8 can be correctly detected, and the virtual angle-of-view frame image 57 can be correctly reproduced in the composite image 55.

The lengths L1 and L2 of the edges of each of the L-shaped angle-of-view mark light 61 to the angle-of-view mark light 64 may be defined regardless of the horizontal edge 59 and the vertical edge 60 of the imaging angle of view 8. In this case, since the ratio (screen aspect ratio) of the horizontal edge 59 to the vertical edge 60 of the imaging angle of view 8 is known, the imaging angle of view 8 can be correctly detected in a case where two of the angle-of-view mark light 61 to the angle-of-view mark light 64 are detected. For example, in a case where the length of the vertical edge 60 is acquired by specifying the vertical edge 60, the horizontal edge 59 can be specified based on the screen aspect ratio, and the virtual angle-of-view frame image 57 can be correctly reproduced in the composite image 55. For example, in a case where the angle-of-view mark light 61 and the angle-of-view mark light 63 close to the horizontal edge 59 on the upper side of the imaging angle of view 8, or the angle-of-view mark light 62 and the angle-of-view mark light 63 at the opposite corners of the imaging angle of view 8 are detected, the imaging angle of view 8 can be correctly detected, and the virtual angle-of-view frame image 57 can be correctly reproduced in the composite image 55.

MODIFICATION EXAMPLE 2

Figure 10A:
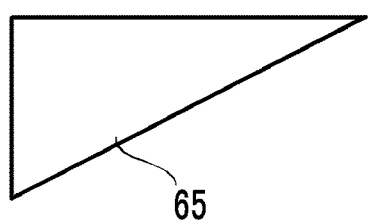
FIG. 10A, FIG. 10B, and FIG. 10C are diagrams illustrating angle-of-view mark light having various projection shapes.
Figure 10B:
Figure 10C:

While the turn-on and turn-off interval and the light emission intensity are illustrated as the light emitting pattern of the angle-of-view mark light 9 changed for each television camera 11 in the first embodiment, the projection shape of the angle-of-view mark light 9 is changed for each television camera 11 instead of or in addition to the turn-on and turn-off interval and the light emission intensity in Modification Example 2. For example, as illustrated in FIGS. 10A, 10B, and 10C, the angle-of-view mark light from each television camera 11 is identified using angle-of-view mark light 65, angle-of-view mark light 66, and angle-of-view mark light 67 having various projection shapes including a triangular shape, a quadrangular shape, and other polygonal shapes (a star shape in FIG. 10C) other than the angle-of-view mark having a circular shape as illustrated in FIG. 1. In this case, the emission source of the angle-of-view mark light can be specified based on the projection shape of the angle-of-view mark light by extracting an area having a predetermined shape from the image based on the first imaging signal.

MODIFICATION EXAMPLE 4

Figure 11:
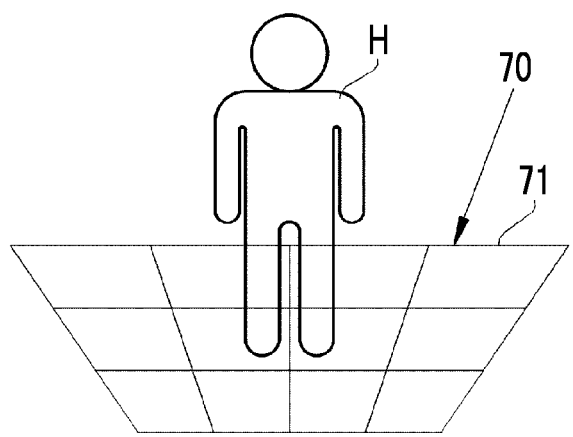
FIG. 11 is a diagram illustrating angle-of-view mark light having a lattice projection shape.

The angle-of-view mark light 9 is emitted to a certain position close to each of the four corners of the imaging angle of view 8 in the first embodiment. Instead or in addition, angle-of-view mark light 70 having a lattice form is emitted in Modification Example 3 illustrated in FIG. 11. The angle-of-view mark light 70 has a plurality of lattice lines 71 that are parallel to the horizontal edge and the vertical edge of the imaging angle of view 8. The outermost frame of the angle-of-view mark light 70 is smaller than the frame of the imaging angle of view 8 or matches the frame of the imaging angle of view 8. In this case, even in a case where a part of the lattice lines 71 of the angle-of-view mark light 70 is not reflected, the imaging angle of view 8 of the other television camera 11 can be acquired by complementing the unreflected lattice line 71 using the other reflected lattice lines 71. In addition, while illustration is not provided, the angle-of-view mark light may be emitted to not only the four corners of the imaging angle of view 8 but also the center of the imaging angle of view 8. In this case, the imaging angle of view 8 is more easily specified.

MODIFICATION EXAMPLE 4

The composite image 55 in which the virtual angle-of-view mark image 56 and the virtual angle-of-view frame image 57 are composited with the video image is displayed on the lens monitor 14 in the first embodiment. Meanwhile, in the composite image 55 of Modification Example 4 illustrated in FIG. 12 and FIG. 13, arrows 75 and 76 as a change displaying image are also composited with the video image in addition to the virtual angle-of-view mark image 56 and the virtual angle-of-view frame image 57. The arrows 75 and 76 show the direction in which the current virtual angle-of-view image is changed from the previous virtual angle-of-view image. The previous virtual angle-of-view image is the virtual angle-of-view image before a certain time period (for example, approximately one to three seconds) from the current point in time. The current virtual angle-of-view image is the virtual angle-of-view image at the current point in time.

In this case, the controller 17 stores, in the memory 51, the position of the virtual angle-of-view mark before a certain time period that is calculated by the calculating unit 52 (the position of a virtual angle-of-view mark image 56-0 illustrated by a dotted line in FIG. 12 and FIG. 13; hereinafter, referred to as the position of a previous virtual angle-of-view mark). The image compositing unit 53 compares the position of the previous virtual angle-of-view mark stored in the memory 51 with the position of the virtual angle-of-view mark at the current point in time (the position of a virtual angle-of-view mark image 56-1 illustrated by a solid line in FIG. 12 and FIG. 13; hereinafter, referred to as the position of a current virtual angle-of-view mark). In a case where the position of the previous virtual angle-of-view mark is the same as the position of the current virtual angle-of-view mark, the image compositing unit 53 does not composite the arrows 75 and 76 as the change displaying image. In a case where the position of the previous virtual angle-of-view mark is different from the position of the current virtual angle-of-view mark, the image compositing unit 53 acquires the arrow 75 that is directed toward the position of the current virtual angle-of-view mark from the position of the previous virtual angle-of-view mark, and composites the arrow 75 with the video image. In addition to the arrow 75, the image compositing unit 36 composites the arrow 76 that shows the direction of change in the position of the imaging angle of view 8 (the position of a virtual angle-of-view frame image 57-1 illustrated by a solid line in FIG. 12 and FIG. 13) at the current point in time found from the position of the current virtual angle-of-view mark with respect to the position of the imaging angle of view 8 (the position of a virtual angle-of-view frame image 57-0 illustrated by a dotted line in FIG. 12 and FIG. 13) before a certain time period found from the position of the previous virtual angle-of-view mark.

Figure 12:
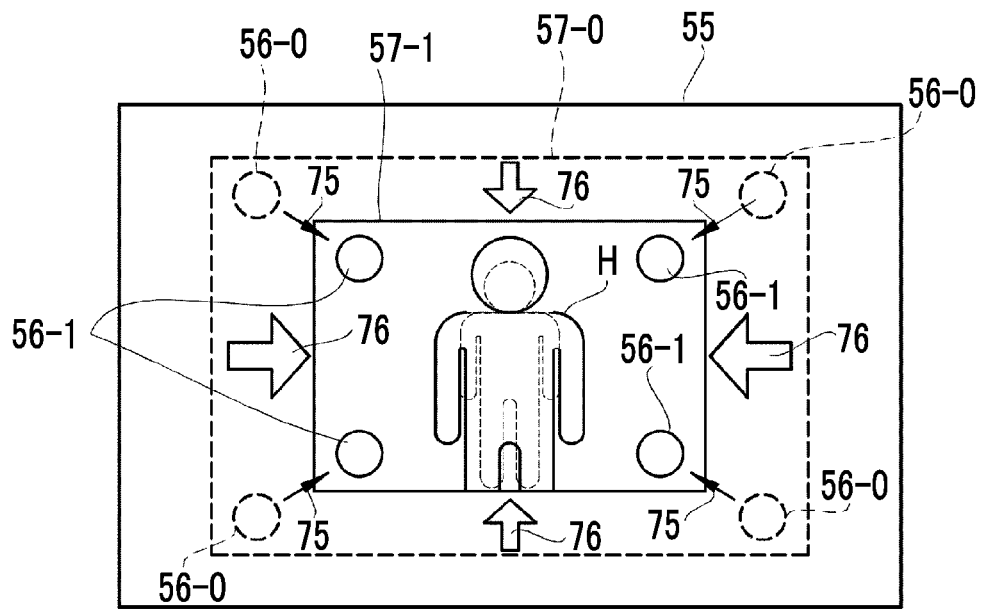
FIG. 12 is a diagram illustrating a composite image acquired by compositing a change displaying image that shows a change in imaging angle of view caused by a zooming operation.
Figure 13:
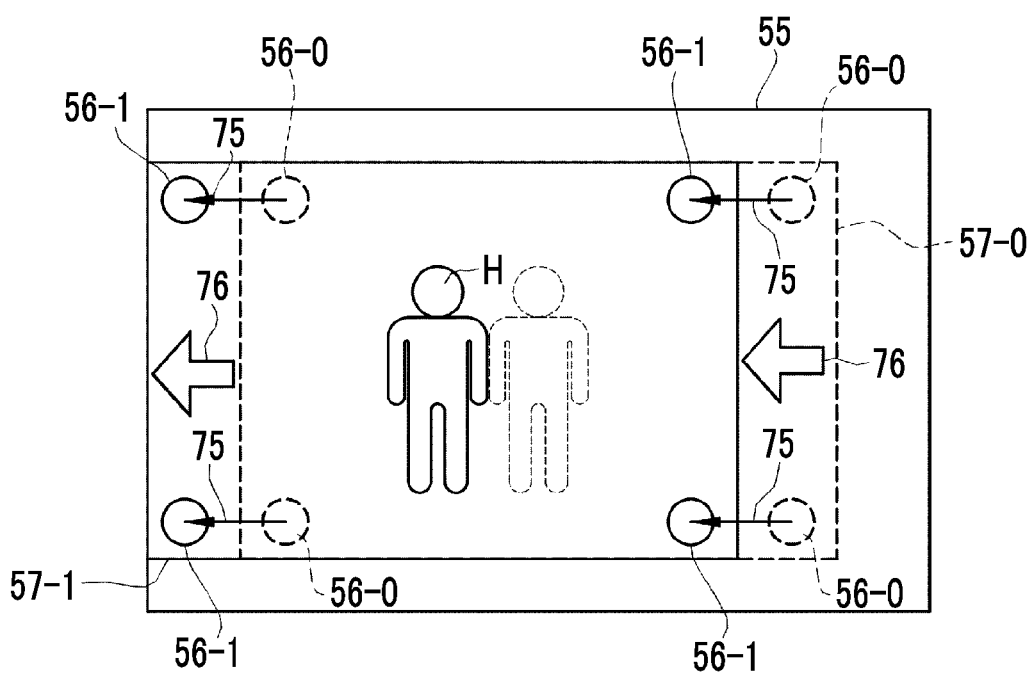
FIG. 13 is a diagram illustrating a composite image acquired by compositing a change displaying image that shows a change in imaging angle of view caused by a pan operation.

FIG. 12 illustrates a case where a zooming operation is performed by the other television camera 11. FIG. 13 illustrates a case where a pan operation is performed by the other television camera 11. By compositing the arrows 75 and 76 as the change displaying image with the video image and displaying the composite image 55, it is possible to easily find the most recent operation performed by the cameraman of the other television camera 11. While the person H before the zooming operation or the pan operation is represented by a dotted line in FIG. 12 and FIG. 13, the person H before the operation is not displayed in actuality. The floor and the wall of the studio 7 are not illustrated in FIG. 12 and FIG. 13. Only one of the arrows 75 and 76 may be displayed. The virtual angle-of-view mark image 56-0 and the virtual angle-of-view frame image 57-0 may not be displayed.

While each mark light source 43 is disposed in the light screen 45 in the embodiments, each mark light source 43 may be disposed in a light screening region formed by pupil splitting (outside a region where light is transmitted by pupil splitting), or may be disposed at a position outside the light screen 45. While a plurality of pupil-splitting lenses 44 is disposed in one light screen 45 in the embodiments, the light screen 45 may be split for each pupil-splitting lens 44 or for each pupil-splitting group that includes several pupil-splitting lenses 44. The focus sensor 46 may also be disposed for each pupil-splitting lens or for each pupil-splitting group depending on the number of splits or the state of arrangement of the pupil-splitting lenses 44.

MODIFICATION EXAMPLE 5

Figure 14:
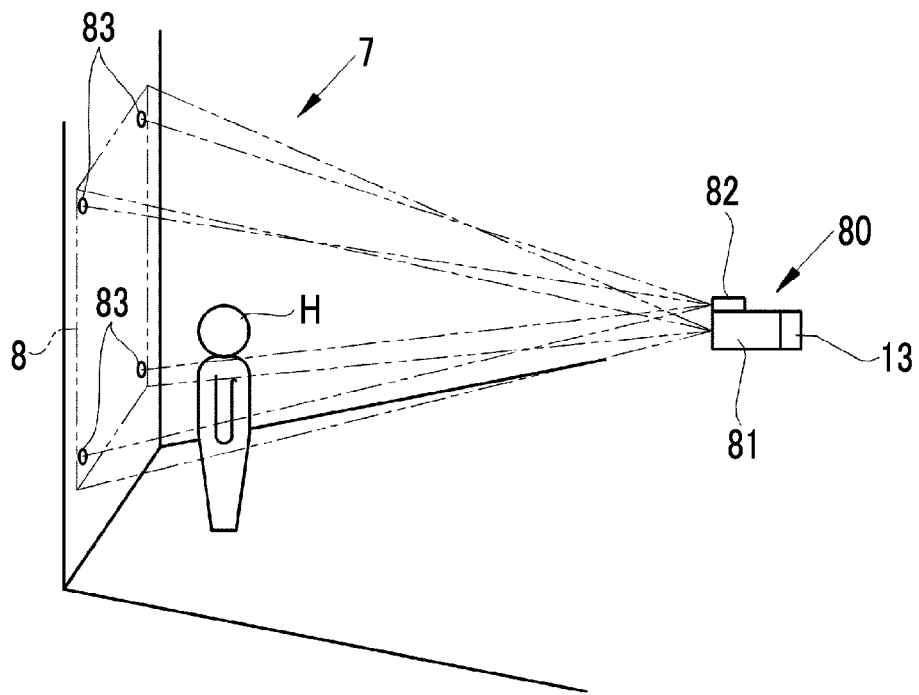
FIG. 14 is a perspective view illustrating an example in which a mark light source is disposed outside a television camera.

In the embodiments, each mark light source is disposed in the light screening region formed by pupil splitting. Instead, in Modification Example 5 illustrated in FIG. 14, a mark light source 82 is disposed outside a lens device 81 of a television camera 80, and angle-of-view mark light 83 is emitted toward the subject. In this case, a deviation between the actual imaging angle of view 8 and the angle-of-view mark light 83 for showing the imaging angle of view 8 that is caused by the optical axis O1 of the imaging lens 16 not matching the optical axis of the angle-of-view mark light 83 is adjusted. In Modification Example 5 as well, the imaging angle of view 8 of the other television camera 11 can be recognized in the same manner as the first embodiment.

Second Embodiment

The composite image 55 is displayed on the lens monitor 14 of the lens device 12 in the first embodiment. Instead or in addition, the composite image 55 is displayed on the camera monitor 15 in the camera body 13 in a second embodiment illustrated in FIG. 15. In this case, the composite image 55 of which the size is reduced is overlaid on the video image based on the second imaging signal displayed on the camera monitor 15. By doing so, the cameraman can recognize the composition in the other television camera 11 from the camera monitor 15.

Figure 15:
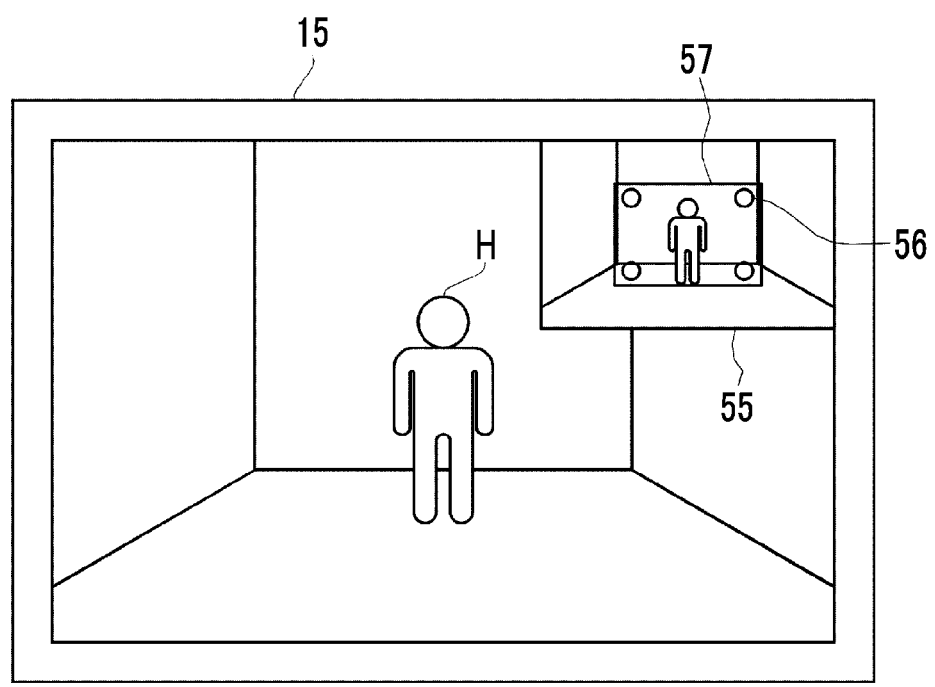
FIG. 15 is a diagram illustrating a second embodiment in which a composite image is displayed on a camera monitor in a camera body.

Alternatively, while illustration is not provided, the composite image 55 may be displayed on the whole screen of the camera monitor 15 instead of forming multiple screens by overlaying the reduced composite image 55 on the video image as illustrated in FIG. 15.

The invention is not limited to the embodiments or modification examples and may employ various configurations without departing from the nature of the invention. For example, the embodiments and the modification examples may be appropriately combined with each other.

The invention can be applied to other imaging devices such as a digital camera, a mobile phone, and a smartphone in addition to a television camera.

EXPLANATION OF REFERENCES

7: studio
8, 8A, 8B: imaging angle of view
9, 9A, 9B, 61, 62, 63, 64, 65, 66, 67, 70, 83: angle-of-view mark light
11, 80: television camera
11A: first television camera
11B: second television camera
11C: third television camera
12, 81: lens device
13: camera body
14, 14A, 14B, 14C: lens monitor
15, 15A, 15B: camera monitor
16, 16A, 16B: imaging lens
17: controller
18: second imaging unit
19: image processing unit
21: fixed-focus lens
22: moving focus lens
23: zoom lens
24: variable stop
25: front relay lens
26: dichroic mirror (extracting unit)
27: rear relay lens
28, 29: lens
31: operating unit
32: color separating optical system
33, 34, 35: video imaging element
37: video switching device
38A, 38B: switcher monitor
39: external device
40: automatic focusing device
41: first imaging unit
42: focus controller
43, 82: mark light source
44: pupil-splitting lens
45: light screen
46: focus sensor
47: mark light detecting unit
48: focus position calculating unit
49: light source driver
50: light emitting pattern changing unit
51: memory
52, 52B: calculating unit
53: image compositing unit
55, 55A, 55B, 55C: composite image
56, 56A, 56B, 56-0, 56-1: virtual angle-of-view mark image (virtual angle-of-view image)
57, 57A, 57B, 57-0, 57-1: virtual angle-of-view frame image (virtual angle-of-view image)
59: horizontal edge
60: vertical edge
71: lattice line
75, 76: arrow (change displaying image)
H: person
O1, O2: optical axis
ST10 to ST18: step
L1, L2: lengths of edges of angle-of-view mark light

What is claimed is:

1. An imaging system comprising
a plurality of imaging devices that image a subject at the same time,
wherein each imaging device includes
a camera body, and
a lens device that is detachably attached to the camera body, and the lens device has
an imaging lens on which subject light including angle-of-view mark light that is emitted from other imaging devices and that shows an imaging angle of view of each of the other imaging devices is incident,
an extracting unit that extracts the angle-of-view mark light from the subject light,
a first imaging unit that images the angle-of-view mark light and outputs a first imaging signal for detecting the angle-of-view mark light,
an image compositing unit that generates a virtual angle-of-view image showing the imaging angle of view of each of the other imaging devices in an imaging angle of view of the host imaging device based on the first imaging signal, and generates a composite image by compositing the virtual angle-of-view image with a video image acquired by imaging the subject light after the angle-of-view mark light is removed by the extracting unit, and
a lens monitor that displays the composite image.

2. The imaging system according to claim 1,
wherein the lens device includes
a mark light detecting unit that detects the angle-of-view mark light based on the first imaging signal, and a calculating unit that calculates a position of a virtual angle-of-view mark showing the imaging angle of view of each of the other imaging devices in the imaging angle of view of the host imaging device based on the angle-of-view mark light, and the image compositing unit generates the virtual angle-of-view image that corresponds to the position of the virtual angle-of-view mark.

3. The imaging system according to claim 2, wherein the lens device has a mark light source that emits the angle-of-view mark light.

4. The imaging system according to claim 3, wherein the first imaging unit is an imaging unit for focus control that controls a focus of the imaging lens to be at a focused position, the mark light source is disposed in the first imaging unit, and the angle-of-view mark light serves as light for the focus control and is emitted toward the subject through the imaging lens.

5. The imaging system according to claim 1, wherein in addition to the virtual angle-of-view image, the image compositing unit composites, with the video image, a change displaying image that shows a change in the virtual angle-of-view image at the current point in time from the virtual angle-of-view image before a certain time period from the current point in time.

6. The imaging system according to claim 1, wherein a light emitting pattern of the angle-of-view mark light is different for each of the plurality of imaging devices.

7. The imaging system according to claim 6, wherein the light emitting pattern is any one of a turn-on and turn-off interval, a light emission intensity, and a projection shape.

8. The imaging system according to claim 6, wherein in a case where the virtual angle-of-view images of two or more of the other imaging devices are composited, the image compositing unit displays the virtual angle-of-view image in a different form for each of the other imaging devices.

9. The imaging system according to claim 6, wherein the lens device includes an operating unit that selects an imaging device for which the virtual angle-of-view image is to be generated from the other imaging devices, and the image compositing unit composites the virtual angle-of-view image of the imaging device selected by the operating unit.

10. The imaging system according to claim 6, further comprising a video switching device that selects one video image from a plurality of the video images generated by the plurality of imaging devices and outputs the selected video image to an external device, wherein the image compositing unit composites only the virtual angle-of-view image of the imaging device of which the video image is selected by the video switching device among the other imaging devices.

11. The imaging system according to claim 1, wherein the imaging angle of view has a rectangular shape, and the angle-of-view mark light has a projection shape along two orthogonal straight lines constituting a corner of the imaging angle of view.

12. The imaging system according to claim 1, wherein the angle-of-view mark light is light in a wavelength range different from visible light.

13. The imaging system according to claim 1, wherein the camera body has a camera monitor, and the composite image is also displayed on the camera monitor.

14. A lens device detachably attached to a camera body of an imaging device used in an imaging system that includes a plurality of imaging devices imaging a subject at the same time, the lens device comprising:

an imaging lens on which subject light including angle-of-view mark light that is emitted from other imaging devices and that shows an imaging angle of view of each of the other imaging devices is incident;

an extracting unit that extracts the angle-of-view mark light from the subject light;

an imaging unit that images the angle-of-view mark light and outputs an imaging signal for detecting the angle-of-view mark light;

an image compositing unit that generates a virtual angle-of-view image showing the imaging angle of view of each of the other imaging devices in an imaging angle of view of the host imaging device based on the imaging signal, and generates a composite image by compositing the virtual angle-of-view image with a video image acquired by imaging the subject light after the angle-of-view mark light is removed by the extracting unit; and a lens monitor that displays the composite image.

15. A method of operating a lens device detachably attached to a camera body of an imaging device used in an imaging system that includes a plurality of imaging devices imaging a subject at the same time, the method comprising:

an extracting step in which an extracting unit extracts angle-of-view mark light that is emitted from other imaging devices and that shows an imaging angle of view of each of the other imaging devices, from subject light including the angle-of-view mark light;

an imaging step in which an imaging unit images the angle-of-view mark light and outputs an imaging signal for detecting the angle-of-view mark light;

an image compositing step in which an image compositing unit generates a virtual angle-of-view image showing the imaging angle of view of each of the other imaging devices in an imaging angle of view of the host imaging device based on the imaging signal, and generates a composite image by compositing the virtual angle-of-view image with a video image acquired by imaging the subject light after the angle-of-view mark light is removed by the extracting step; and a displaying step of displaying the composite image on a lens monitor.

* * * * *